April 17, 1951   A. SHANER ET AL   2,549,338
MACHINE FOR MAKING SPRING LINERS
Filed Nov. 20, 1948   9 Sheets-Sheet 5
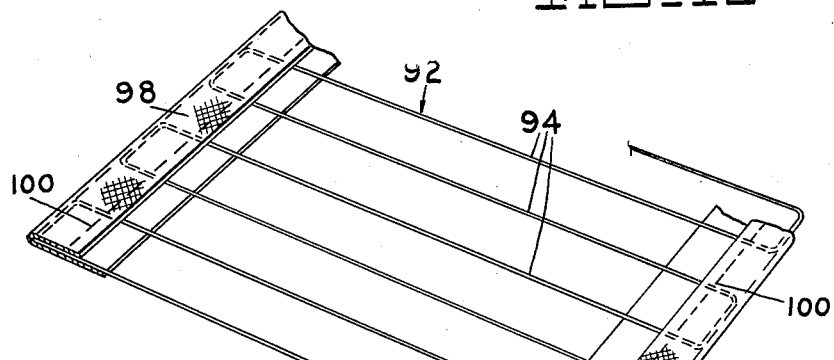
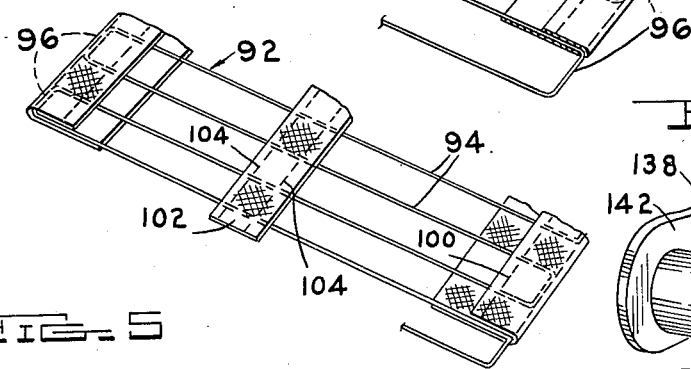
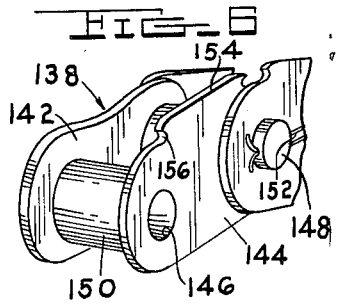
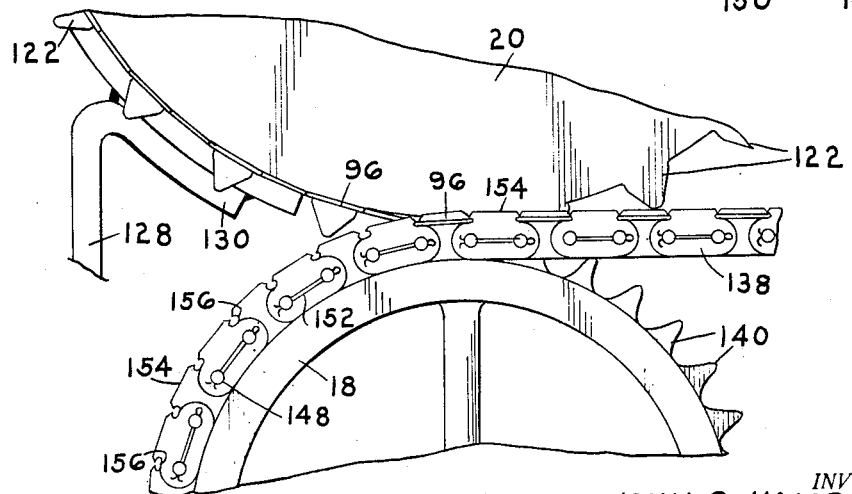
INVENTOR.
JOHN C. HAMPSON
ANTHONY SHANER
BY
*Burton & Parker*
ATTORNEYS

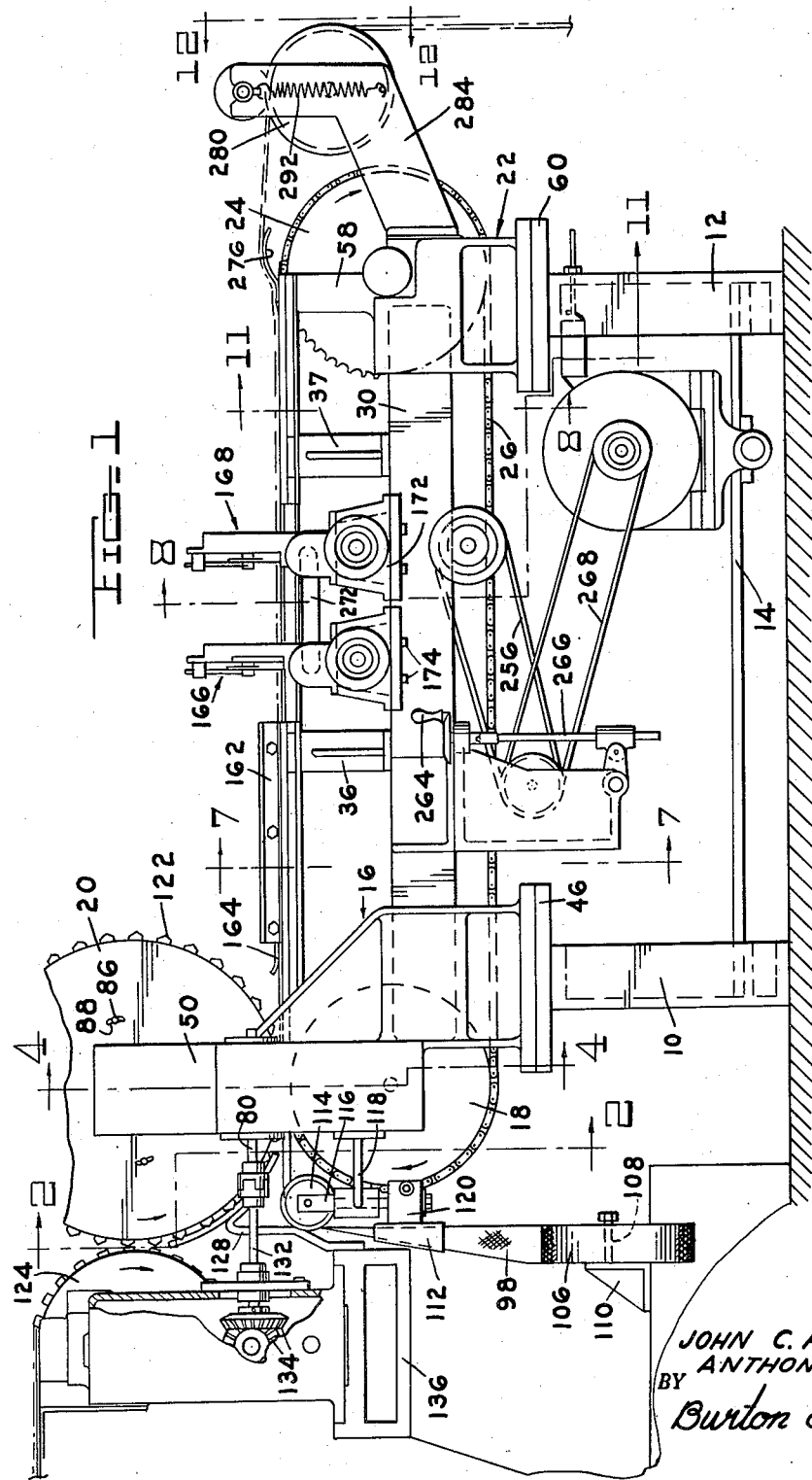

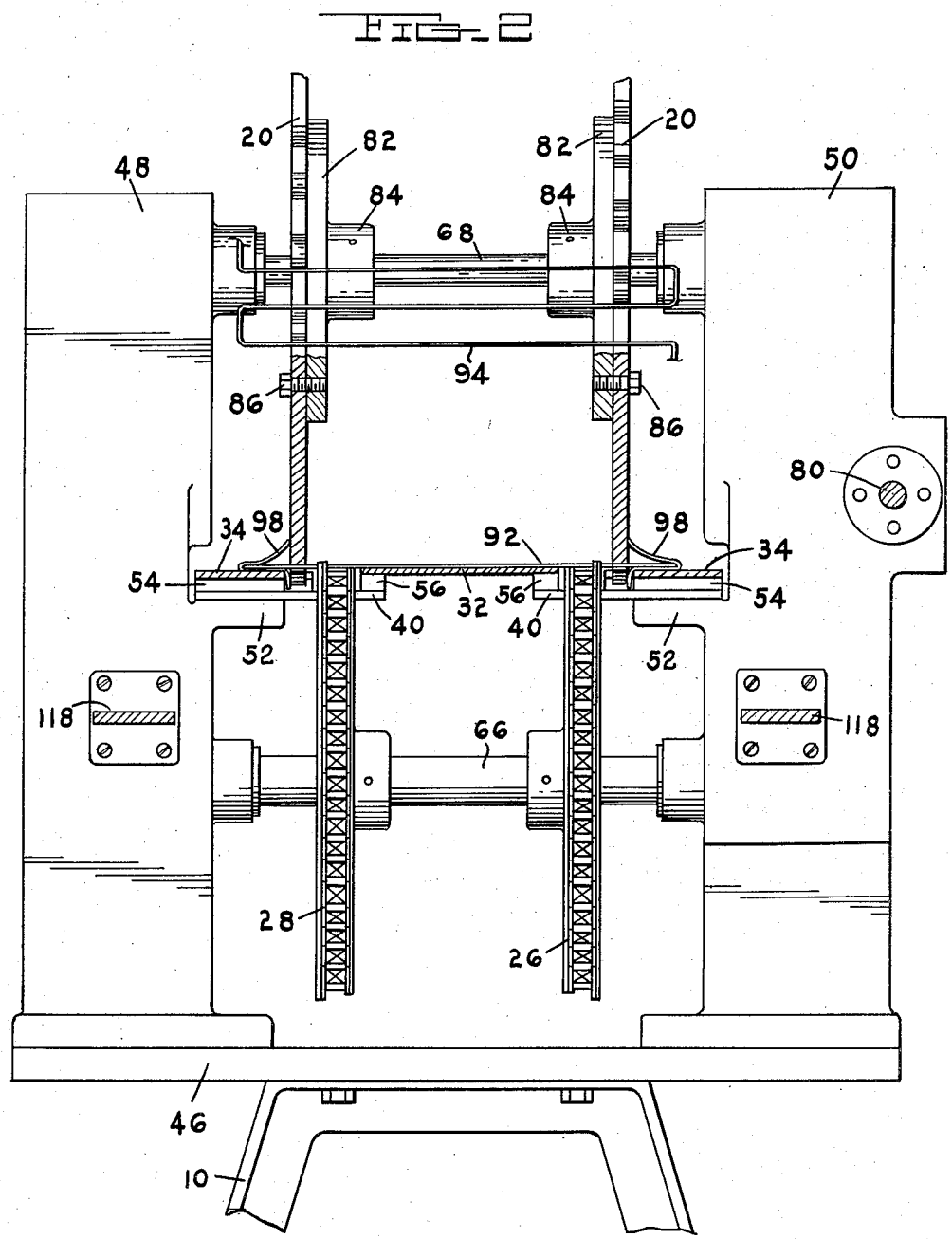

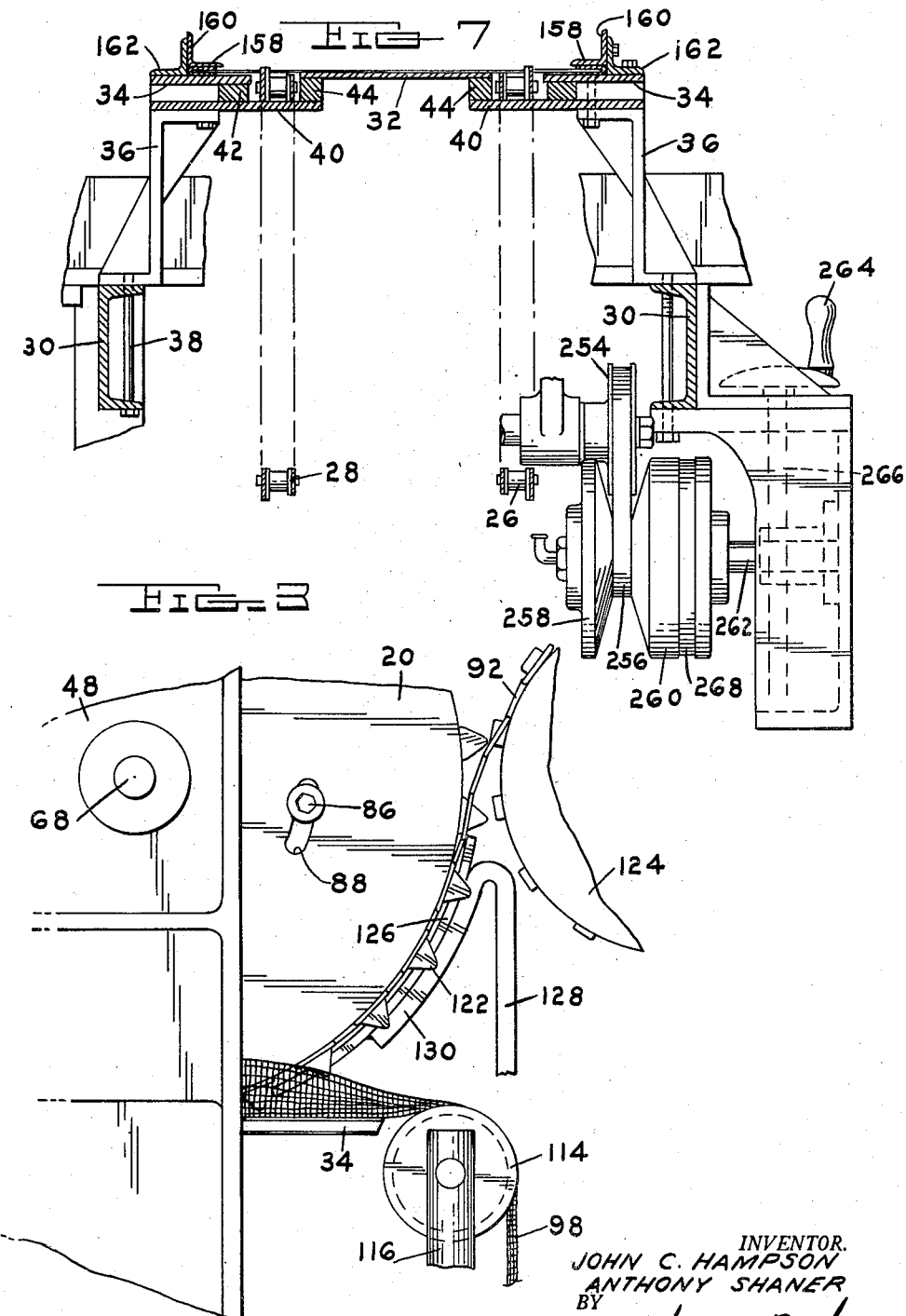

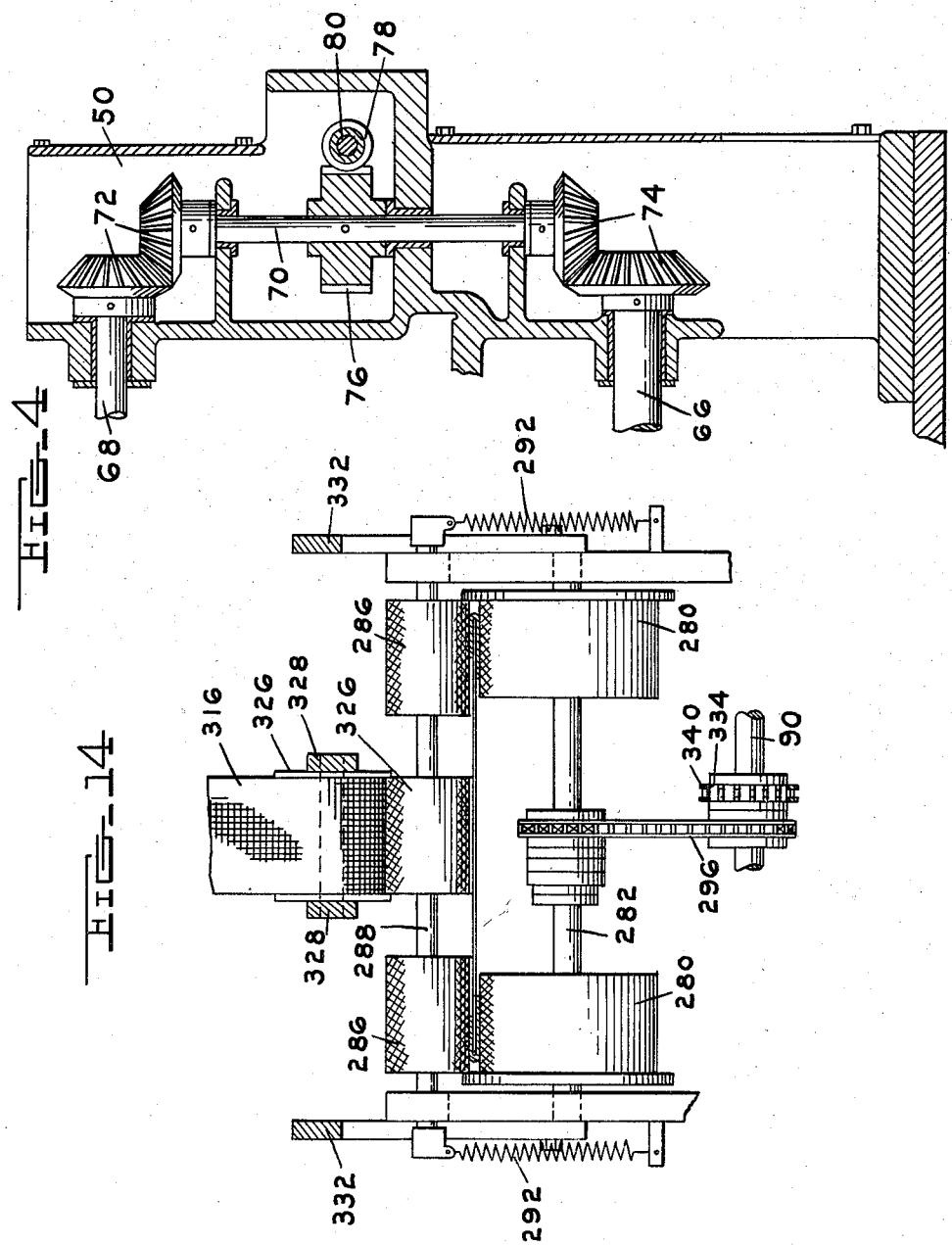

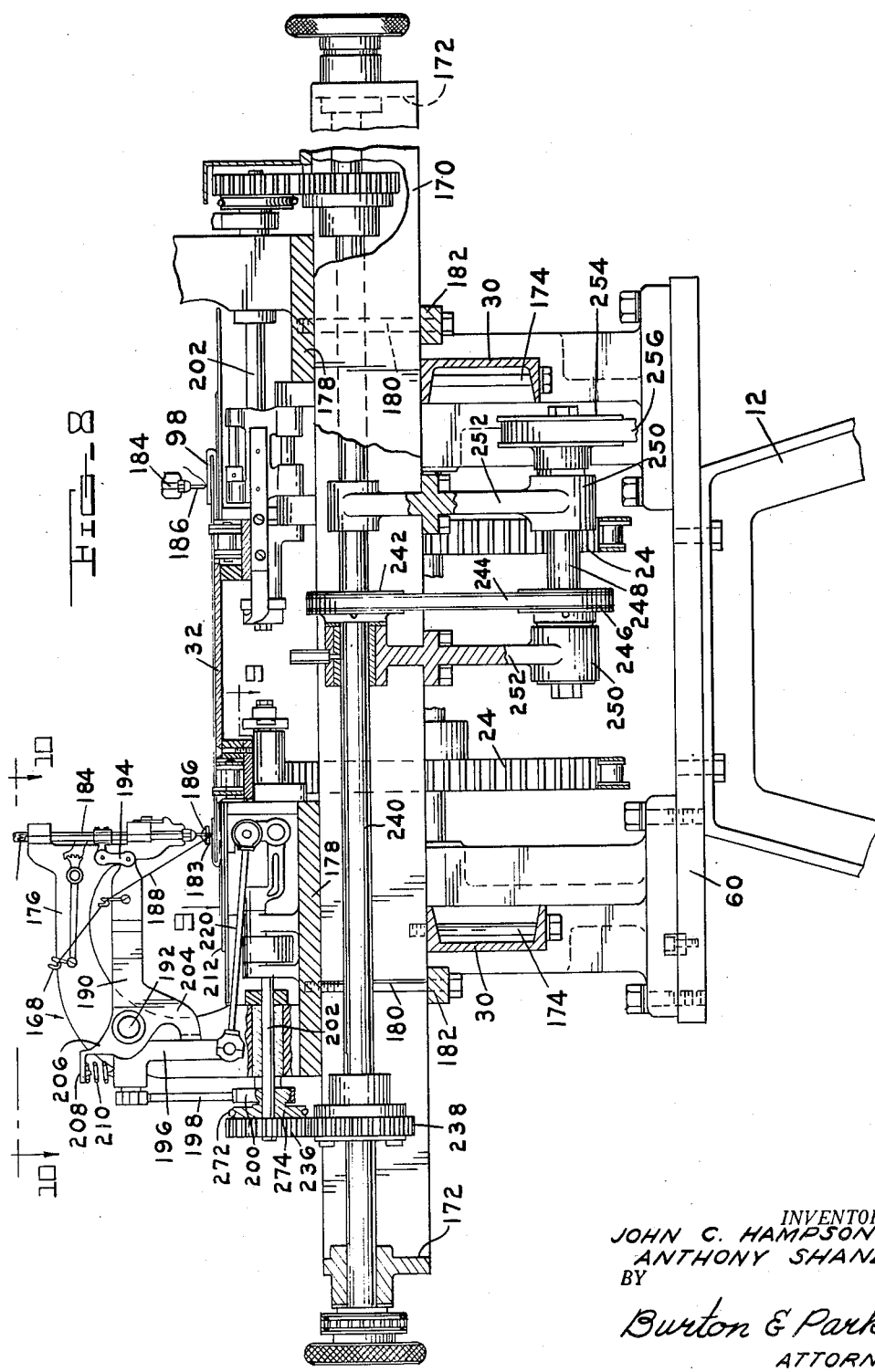

April 17, 1951     A. SHANER ET AL     2,549,338
MACHINE FOR MAKING SPRING LINERS
Filed Nov. 20, 1948     9 Sheets-Sheet 7
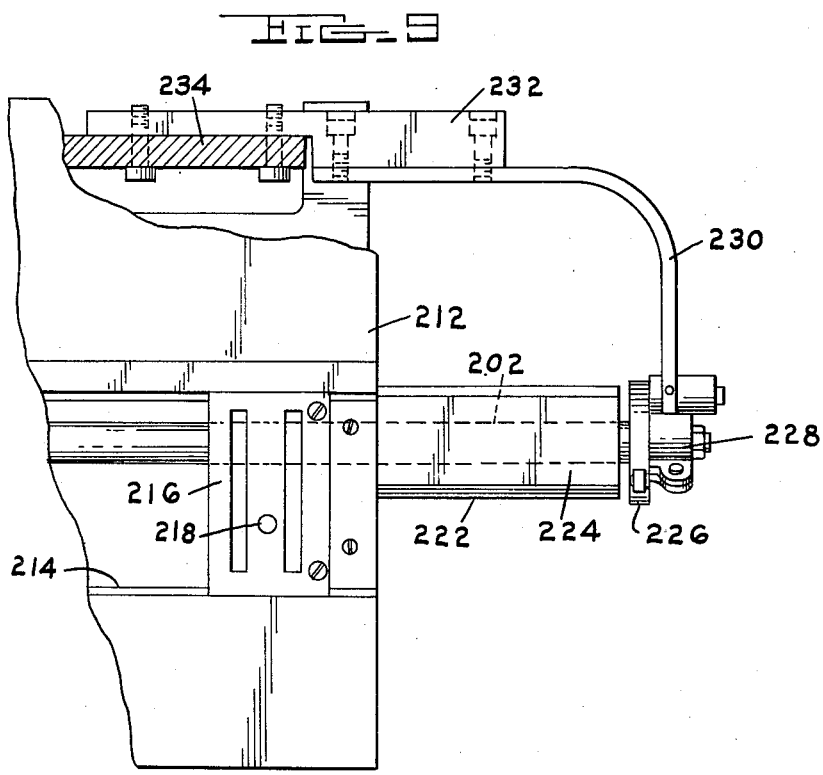
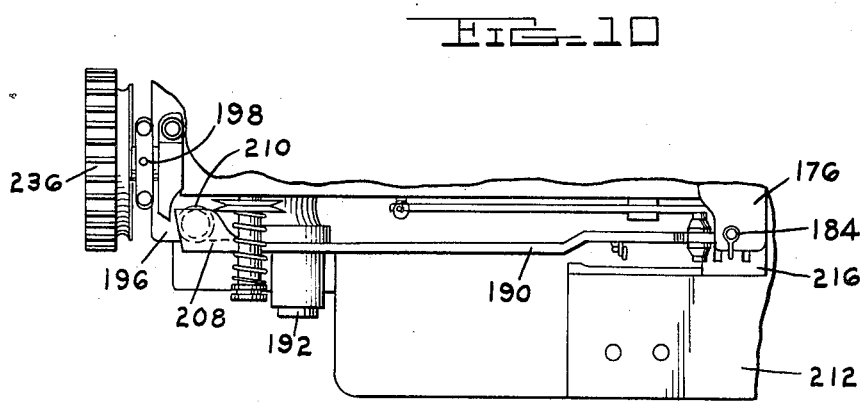
INVENTOR.
JOHN C. HAMPSON
ANTHONY SHANER
BY Burton & Parker
ATTORNEYS

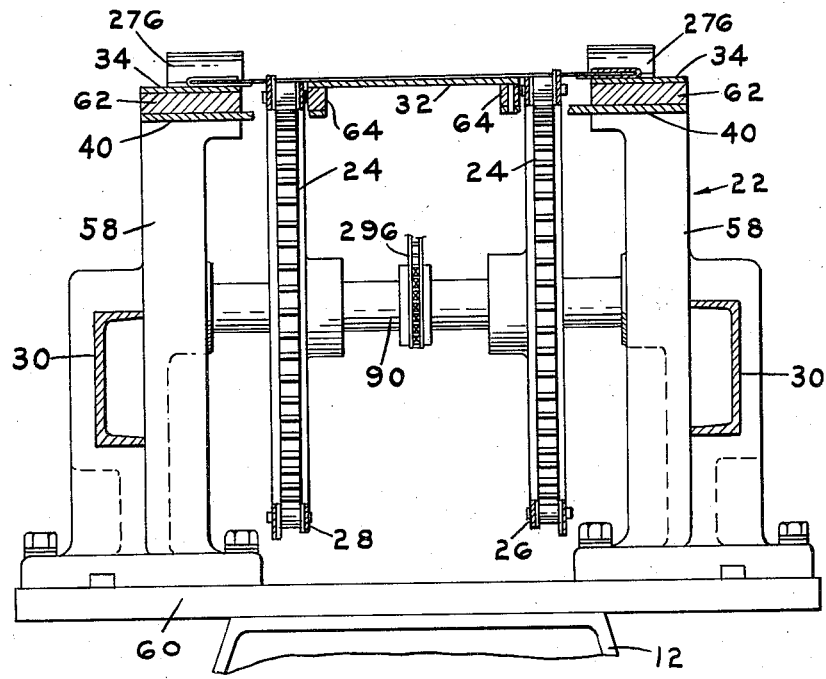
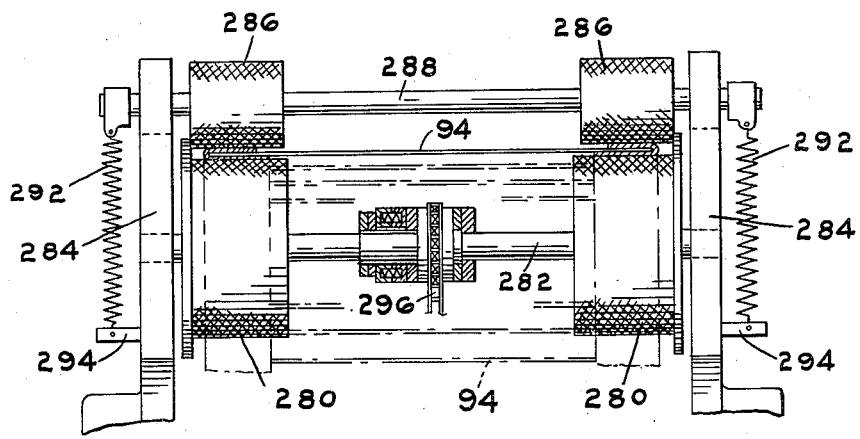

April 17, 1951   A. SHANER ET AL   2,549,338
MACHINE FOR MAKING SPRING LINERS
Filed Nov. 20, 1948   9 Sheets-Sheet 9
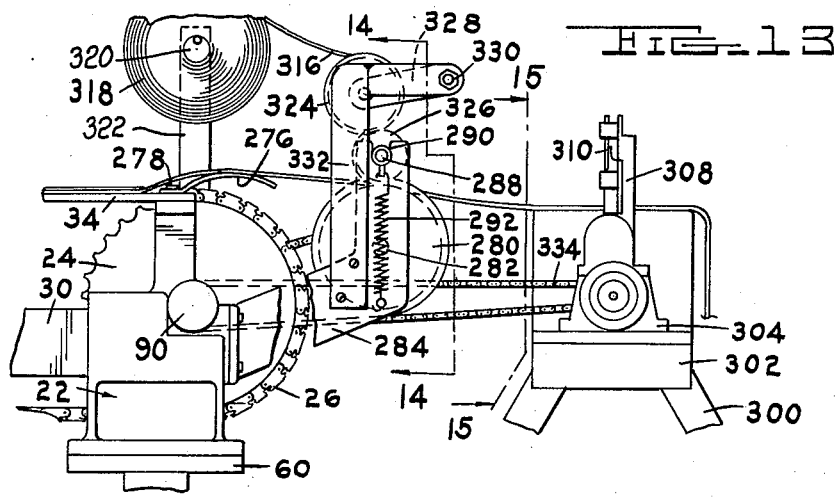
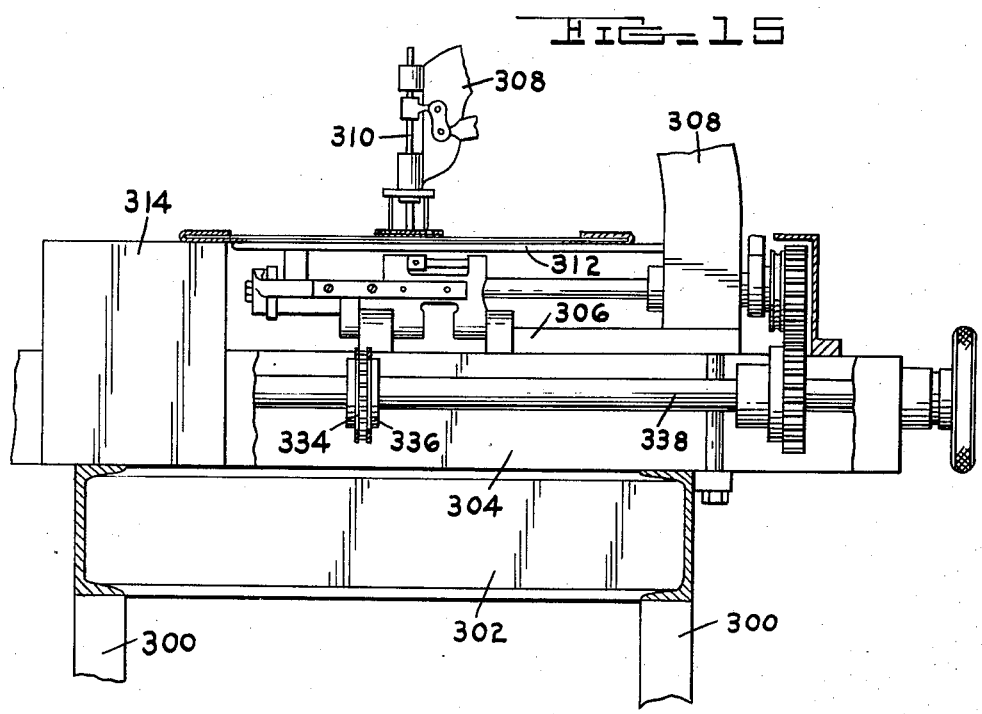
INVENTOR.
JOHN C. HAMPSON
ANTHONY SHANER
BY
Burton & Parker
ATTORNEYS Patented Apr. 17, 1951

2,549,338

UNITED STATES PATENT OFFICE 2,549,338

MACHINE FOR MAKING SPRING LINERS

Anthony Shaner and John C. Hampson, Detroit, Mich., assignors to Falls Spring & Wire Company, Detroit, Mich., a corporation of Michigan, and Great Lakes Spring Corporation, Chicago, Ill., a corporation of Illinois Application November 20, 1948, Serial No. 61,266

23 Claims. (Cl. 112—2)

This invention relates to machines for fabricating composite articles of wire and fabric or the like and particularly to machines for making spring liners or mats adapted to be interposed between a spring unit and the upholstering covering material.

An important object of this invention is to provide a machine of the above mentioned character which rapidly and inexpensively produces a composite wire and fabric article for use as a spring liner or the like. An important object of this invention is to provide a machine of this character which is automatic in operation and except for the occasional attendance of the operator to see that a sufficient amount of wire and fabric is available operates automatically for long periods of time without the necessity of any manual labor. A further important object of the invention is to provide an improved machine for assembling and connecting together reversely or sinuously bent wire stock and fabric strips which functions in a continuous manner, separately receiving the wire stock and fabric at one end and discharging the same from the other end in the desired connected condition.

In carrying out the invention into a practical embodiment, a group of mechanisms are brought into intimate cooperated relationship and through the combined action of each, starting with a source of reversely bent wire stock and a source of fabric or liner material, the two elements are continuously advanced endwise in superimposed relationship over a supporting table and stitched or otherwise secured together as they advance thereover. An important feature of the invention relates to the conveyor mechanism for engaging the wire stock as it enters upon the table and maintaining such engagement until the opposite end of the table is reached where the wire stock is automatically released from the conveyor. Another important feature of the invention relates to the mechanism for feeding one or more strips of fabric or liner material to the wire stock and securing same together as they advance over the table, and particularly to the provision for folding a strip of liner material over one or both side margins of the wire stock as it enters upon the table. A further important feature of the invention relates to the mechanism for stitching the liner material to the wire stock and particularly to the provision for preventing the stitching needle from breaking in the event it should strike a portion of the wire stock in operation. Other features of the invention relate to the adaptability of the machine for making various kinds of spring liners and the adjustability of the parts to vary the operation of the separate mechanisms.

Various other objects, advantages and meritorious features of this invention will become more fully apparent from the following specification, appended claims and accompanying drawings wherein:

Fig. 1 is a side elevation of a machine embodying the invention,

Fig. 2 is a vertical sectional view through a forward portion of the machine taken along line 2—2 of Fig. 1, Fig. 3 is an enlarged detail interior view of a forward part of the machine illustrating the manner of feeding both the wire stock and the liner material onto the table in overlapping relationship, Fig. 4 is a vertical sectional view through a forward part of the machine illustrating the driving connections for the feeding and conveyor mechanisms, Fig. 5 is an enlarged fragmentary view illustrating the manner in which the conveyor mechanism receives and advances the wire stock for travel over the table, Fig. 6 is an enlarged detail perspective view of the link organization of the conveyor mechanism, Fig. 7 is a vertical sectional view taken through an intermediate portion of the machine along line 7—7 of Fig. 1, Fig. 8 is a vertical sectional view through an intermediate portion of the machine taken along line 8—8 of Fig. 1, Fig. 9 is a detail horizontal sectional view of a portion of the machine adjacent to a stitching mechanism taken along line 9—9 of Fig. 8, Fig. 10 is a top plan view of a stitching mechanism taken along line 10—10 of Fig. 8, Fig. 11 is a vertical sectional view taken through the machine adjacent to the rear end thereof along line 11—11 of Fig. 1, Fig. 12 is a rear end view of the machine illustrated in Fig. 1 taken along line 12—12 thereof, Fig. 13 is a side elevation of an attachment adapted to be mounted on the rear end of the machine of Fig. 1, Fig. 14 is a vertical sectional view through the attachment of Fig. 13 taken along line 14—14 thereof, Fig. 15 is a vertical sectional view through the attachment of Fig. 13 taken along line 15—15 thereof, Fig. 16 is a perspective view of a portion of a spring liner produced by the machine of the present invention, and Fig. 17 is a perspective view of a modified form of spring liner produced by the machine.

The machine illustrated in the drawings is particularly adapted for the manufacture of spring liners and in general comprises means for feeding separate elements of the liner upon a platform or table, conveying the same along the table in juxtaposed relationship, stitching or otherwise securing same together, and releasing the secured parts of the liner from the conveyor at the discharge end of the machine.

Referring to Fig. 1, the machine in general comprises a supporting frame including an inverted substantially U-shaped floor engaging frame member 10 at the forward end of the machine and a similar frame member 12 at the rear end of the machine, the two being connected by a low-lying horizontal frame member 14. The forward floor engaging frame member 10 supports a frame assembly generally indicated at 16 including as shown in Fig. 2 a pair of sprocket wheels 18—18 rotatable about a common horizontal axis and a pair of toothed wheels 20—20 also rotatable about a common horizontal axis and spaced vertically above the sprocket wheel assembly 18—18. The rear floor engaging frame member 12 supports a frame assembly generally indicated at 22 including as shown in Fig. 11 a pair of sprocket wheels 24—24 rotatable about a common axis. Each pair of sprocket wheels 18—18 and 24—24 are located on opposite sides of the machine and in alignment with one another such that the sprocket wheels on one side of the machine may support and move an endless linked chain 26 and the sprocket wheels on the other side may similarly support and move an endless linked chain 28.

The two frame assemblies 16 and 22 are connected together by longitudinally extending frame members comprising a pair of inwardly opening channel shaped side bars 30—30. The side bars 30—30 extend parallel to one another on a level approximating the axes of rotation of the sprocket wheels. Spaced above the side bars and extending longitudinally the length of the machine is a platform assembly including a central platform section or table 32 and two correspondingly shaped outer platform or table sections 34—34 on opposite sides of the central section and extending parallel but in slight spaced relationship thereto.

Forwardly of the center of the machine, as shown in Fig. 7, the platform assembly is supported in raised position above the side bars 30—30 by a pair of correspondingly shaped brackets 36—36 located on opposite sides of the longitudinal median line of the machine. The lower ends of the brackets 36 are flanged outwardly and bear upon the side bar 30 over which they are disposed and may be secured thereto by bolts 38. The upper ends of the brackets 36 are flanged inwardly and each supports an inwardly projecting longitudinally extending plate 40. Each plate 40 projects beyond the inner edge of the platform section 34 with which it is associated and by means of spacer members 42 and 44 respectively supports the outer platform section 34 and the central platform or table 32. As shown in Figure 1, a similar set of platform supporting brackets 37—37 and associated elements may be provided rearwardly of the center of the machine.

At the forward end of the machine, as shown in Figs. 1 and 2, the frame assembly 16 is supported by means of a transversely extending plate 46, which is bolted or otherwise secured to the upper end of the U-shaped floor engaging support 10. Included in the frame assembly 16 are two transversely spaced apart uprights or frame members 48 and 50 having their lower ends supported upon the plate 46. Intermediate their heights the two uprights 48 and 50 are provided with correspondingly shaped inwardly projecting ledges 52—52 which support the forward end of the platform assembly. Mounted on the ledges are the forward ends of the plates 40 which as previously described in connection with Fig. 7 project inwardly beyond the side platform sections 34—34 and under the central table section 32. Both the platform sections 34—34 and the table 32 are respectively supported on spacer blocks 54 and 56 similar to that shown in Fig. 7.

An organization generally similar to that shown in Fig. 2 is provided at the rear end of the machine and includes two transversely spaced apart uprights or frame members 58—58 bolted or otherwise secured at their bases to a transverse plate 60 supported upon the upper end of the floor engaging frame member 12. The rear ends of the plates 40—40 previously described are supported on the upper ends of the uprights 58—58 and by means of spacer blocks 62 and 64 each plate 40 respectively supports the outer platform sections 34 and the table 32 under which it extends.

The forward set of sprocket wheels 18—18 as shown in Fig. 2 are fixed to a common shaft 66 journaled at its opposite ends into uprights 48 and 50. The toothed wheels 20—20 are fixed to a common shaft 68 similarly journaled at its opposite ends in the upright members. The two shafts are driven together from the same source of power. As shown in Fig. 4 rotatably supported in the hollow interior of the upright frame member 50 is a vertically extending shaft 70 operatively engaging at its upper end the shaft 68 through a set of beveled gears 72 and operatively engaging at its lower end shaft 66 through a set of beveled gears 74. Fixed to the intermediate portion of the shaft 70 is a pinion 76, the teeth of which engage a worm gear 76 mounted on and rotatable with a horizontally extending drive shaft 80. Actually, for the purpose of adjustment hereinafter described, the toothed wheels 20—20 are not directly connected to the shaft 68 but are circularly adjustably supported upon the plates 82—82 of smaller diameter which are connected by hubs 84—84 to the shaft 68. Bolts 86 extending through arcuate slots 88 (Fig. 3) in the toothed wheels serve to adjustably secure the wheels to the plates 82 within the limit of movement provided by the slots. Similarly, the rear set of sprocket wheels 24—24 are fixed to a common shaft 90 which as shown in Fig. 11 has its opposite ends journaled in the upright frame members 58—58 for rotation.

As previously mentioned endless conveyor chains 26 and 28 are trained or passed over the sprocket wheels and are endlessly driven thereby. The sprocket wheels 18—18 and 24—24 are located below and in line with the spaces or slotted openings between the central section 32 of the platform assembly and the outer platform sections 34—34 thereof. The upper section of each endless chains 26 and 28 extends on substantially the level of the platform assembly and runs the entire length thereof. Each chain 26 and 28 is guided at the forward end of the machine over the plates 40—40 and below the slotted openings between the center section 32 of the platform and the outer sections 34—34. The plates 40—40 serve as supports for the chain lengths advanced thereover and together with the slotted openings between the platform sections and the spacer blocks on either side thereof form tracks along which the chains are guided. In operation, the sprocket wheels 18—18 and 24—24 rotate in the direction of the arrows in Fig. 1 causing the upper portions of the two endless chains to travel from the forward end of the platform to the rear end thereof. The relation of the plates 40—40 to the height of the links of the chains is such that the upper side of the links extends approximately flush with the upper surfaces of the platform, there being provided a slight projection on each link hereinafter described which rises above the level of the platform for the purpose of gripping the wire stock fed to the machine. Although the platform is longitudinally slotted to provide a pair of parallel tracks for two endless chains on either side of the center line thereof, it is manifestly obvious that in certain machines of this character, the platform could be constructed with only one track for a single endless conveyor chain rather than the two shown in the illustrated embodiment of the invention.

The spring liner produced by the machine is formed of bent wire stock and one or more strips of fabric, such as burlap, gunny sack or any other suitable material. Figs. 16 and 17 illustrate two forms of such spring liner. The wire stock is generally indicated at 92 and as shown is reversely bent to provide a plurality of sinuous lateral turns forming a successive series of laterally projecting portions 94 connected at alternate ends by relatively short longitudinal portions 96. The wire stock thus formed provides a sinuous zig-zag reinforcement for the spring liner. Folded over either or both side marginal portions of the reversely bent wire stock are strips of fabric indicated by the characters 98—98. One fold of each strip may be wider than the other as illustrated or of the same dimensions. The folded overlapping portions of each strip 98 are stitched together between the wire portions 94 as indicated by the line of stitching 100. Additional parallel lines of stitching may be provided in those instances where additional securement is desired.

The form of spring liner illustrated in Fig. 17 is similar to that shown in Fig. 16 except an additional strip of burlap or the like 102 is stitched to the central portion of the wire stock. The strip may be relatively narrow as shown or substantially wider depending upon the use of the liner. Two rows of stitching 104—104 are employed to secure the central strip 102 to the wire stock. In all forms, the stitching threads are looped over or under the lateral portions 94 of the wire stock securely connecting the fabric to the wire.

As previously mentioned, the separate elements constituting the spring liner are fed into the forward end of the platform and are advanced by the conveyor mechanism from the forward end to the rear end of the platform. As shown in Fig. 1, one of the burlap fabric strips 98 is taken in flat form off of a roll 106 rotatably supported on one side of the machine on a stud shaft 108 carried by bracket 110. A similar roll and support therefor is provided on the other side of the machine. Each fabric strip is delivered upwardly vertically and passes through a folding tube or sleeve 112 and over a roller 114 adjacent to the forward end of the platform and in line with the outer section 34 thereof. The shaft of each roller 114 is supported by a vertical bar 116 mounted in any suitable manner upon a forwardly projecting horizontally extending bar 118 forming part of the frame assembly 16. The lower end of the supporting bar 116 carries a bracket 120 upon which the folding sleeve 112 is mounted and provision may be made for adjusting the bracket 120 on the bar 116.

The wire stock is fed to the forward end of the machine from a source which is preferably a wire bending machine of the character described in the United States Patent to Van Dresser et al. No. 2,047,717. The machine of the present invention for this purpose is preferably mounted as shown in Fig. 1 immediately adjacent to the discharge end of such a wire bending machine and receives the reversely bent wire stock therefrom and carries it upon the forward end of the platform. The toothed wheels 20—20 of the present machine engage the wire stock by interposing the teeth 122 thereof between the laterally extending portions 94 of the wire stock in the manner shown in Figs. 3 and 5. Each tooth 122 is generally triangularly shaped having its base wide enough to pass between successive lateral portions 94 of the wire stock and hold the same with little or no play relative to the wheel. The toothed wheels are arranged in cooperative relationship with the discharge end of the wire bending machine in position to receive the wire stock therefrom. As shown in Figs. 1 and 3, the toothed wheels are disposed immediately adjacent to the forming drums of the wire bending machine, one of which is shown at 124 and may correspond to one of the pair of forming drums 56 and 57 of the Van Dresser et al. patent previously mentioned. Immediately as the wire stock is discharged from the forming drums 124, they are picked up by the teeth 122 of the wheels 20—20 and conveyed downwardly in an arcuate path to the forward end of the platform as shown in Fig. 3.

To hold the wire stock in close engagement with the toothed wheels 20—20 and after it is received thereon, there is associated with each toothed wheel a guiding member which acts to deeply seat the wire stock between the teeth 122 for the angular distance of movement between the point where the wire stock is received on the wheels and the bottom side thereof above the entering end of the platform. Referring particularly to Fig. 3, there is shown an arcuate segment 126 adjacent to the periphery of each toothed wheel 20 and having the same curvature as the wheel. This arcuate segment is disposed in lateral offset relationship to the teeth 122 so that the latter may pass closely thereby and in slightly spaced relation to the peripheral base of the wheel from which the teeth project in order to allow the wire stock to be received therebetween. The arcuate segment extends from the point approximately where the wire stock is fed on the toothed wheel to a point just above the entering end of the platform as shown in Fig. 3. The segment 126 is supported in any suitable manner such as by the vertical rod 128 having a downwardly curving end section 130 to which the outer side of the segment is welded or otherwise secured.

When the machine of the present invention is disposed immediately adjacent to the discharge end of the wire bending machine of the character previously mentioned, it is desirable to connect the moving parts of the two machines together for synchronized operation. For this purpose the driving shaft 80 for the sprocket wheels 18—18 and the toothed wheels 20—20 extends forwardly and is clutched to a shaft 132 forming part of the wire bending machine. The latter shaft projects into an adjacent housing of the wire bending machine and may be operatively connected to the driving mechanism thereof by means of the set of beveled gears 134 as shown in Fig. 1. For convenience, the bar 128 which carries the arcuate segment 126 may be fixed to a base portion 136 of the wire bending machine and similarly the bracket 110 which carries the stud shaft for the fabric strip roll may be likewise mounted on the wire bending machine as shown in Fig. 1.

Each folded strip 98 after it passes over the roller 114 is slightly unfolded in order to receive the side margin of the wire stock between the folded sections thereof. As shown in Figs. 2 and 3, the upper folding section of the strip 98 is caused to engage the outer side of the toothed wheel 20 along which it passes and is bent upwardly and outwardly thereby to an inclined position. In this manner, the wire stock fed by the teeth 122 to the platform is dropped upon the horizontal fold section of the fabric strip advancing on the platform section 34 while the inclined folded section of the strip is advanced in raised position above the wire stock alongside of the toothed wheel between same and the adjacent upright 48 or 50 of the machine. The particular position assumed by the two folded sections of each strip under the toothed wheels is shown in Fig. 2.

The wire stock 92 as it is fed upon the platform has a lateral dimension such that it overlies the tracks through which the endless chains 26 and 28 are guided and projects outwardly therebeyond for support upon the outer platform sections 34—34 as shown in Fig. 2. The endless chains as they pass upwardly around the forward set of sprocket wheels 18—18 are shaped in a particular manner to engage the laterally extending portions 94 of the wire stock and convey the same in this engaged relationship the full length of the machine. This operation is accomplished by the special design of the individual links making up each chain.

Referring to Figs. 5 and 6, each endless chain comprises a series of links 138 pivotally connected together in endwise relationship and adapted to engage the teeth 140 of the sprocket wheels in the conventional manner. Each link is constructed in a novel manner for engaging the lateral portion 94 of the wire stock as it is delivered to the forward end of the platform by the toothed wheels 20—20. Each link comprises a pair of parallel vertically extending spaced apart side plates 142 and 144. The side plates of each link have their opposite ends overlapping upon the ends of the corresponding side plates of the next adjacent links of the chain as in conventional practice. Overlapping the ends of the plates are apertures as at 146 in Fig. 6 to receive the ends of transversely extending pivot pins 148 in order to allow the links to pivot with respect to one another as they travel around the sprocket wheels and assume their straight line motion between the sprocket wheels. Supported by each pivot pin is spacer sleeve 150 which is preferably free to rotate thereon. Each sleeve 150 is shorter than the pin upon which it is mounted and occupies the space between the side plates as shown in Fig. 6 holding the latter at the desired spaced relation to be received over the teeth of the sprocket wheels. The end of the pins 148 projecting through the side plates 142 are headed or otherwise shaped for abutting engagement with the outside faces thereof. The opposite ends of the pins project from the side plates 144 and are held against withdrawal by removable cotter pins or the like. As shown, this may be accomplished by utilizing elongated cotter pins 152 which extend between each pair of pins and through the projecting ends thereof to hold the same on the chain. As the chains pass around the sprocket wheels the sleeves 150 carried by the pins ride into the notches between the sprocket teeth 140 and upon rotation of the forward set of sprocket wheels in the direction of the arrows in Figs. 1 and 5, the chains will advance through the tracks from the forward end of the platform to the rear end thereof.

Each adjacent pair of links of the endless chains are provided with jaw-like means for releasably gripping the wire stock as it enters upon the platform for conveying the wire stock to the other end of the platform where the jaws automatically open to release the wire stock. This is accomplished in the manner illustrated in Figs. 5 and 6 by providing each side plate 144 of the link with a raised edged portion 154 which has a longitudinal length approximately equal to the distance between the successive lateral portions 94 of the wire stock and which terminates substantially opposite to the axes of the two pivot pins 148 extending through the plate. The opposite ends of the raised portion 154 of each link are undercut to provide wire receiving recesses or notches 156. These notches are arranged to cooperate with similar notches in the plates 144 of the next adjacent links to form jaws which are self-operable to open and close. The relation of each pair of cooperating notches is such that when the links move in a straight line, as between the forward and rear sets of sprocket wheels, the jaws are in closed position, but when the links pass around either the forward or rear set of sprocket wheels, the jaws are in open position.

Thus when the links 138 on the forward set of sprocket wheels 18—18 move upwardly for advancement upon the tracks, the jaws are open to receive the lateral portions 94 of the wire stock, and as shown in Fig. 5 these wire sections are successively fed into the open jaws as they are freed from the teeth of the wheels 20—20. Due to the offset relation of the toothed wheels to the sprocket wheels 18—18 as shown in Fig. 2 and to the mounting thereof on their respective drive shafts, the teeth 122 of the former and the teeth 140 of the latter overlap upon one another. The raised portions 154 of the chain links arriving at the top of the sprocket wheels 18—18 project above the teeth 140 thereof and the jaws formed by the notches 156 receive the wire sections 94 as they pass under the wheels 20—20. Thereafter as the links pivot with respect to one another to assume their straight line motion through the tracks of the platform, the jaws close upon the wire sections received therein and effectively grip the same throughout the travel of the wire stock over the platform. A similar but reverse operation occurs when the chain links are engaged by the rear set of sprocket wheels 24—24 and carried downwardly therearound. The links pivot with respect to one another to spread the notches 156 thereof and open the jaws allowing the wire stock to be released therefrom. The rotative relationship of the toothed wheels to the sprocket wheels at the forward end of the platform is such as to transfer the wire stock from the toothed wheels into the jaws of the chain links as the two come together. Any adjustment that may be necessary to effect this transfer in an efficient manner may be accomplished by circularly shifting the toothed wheels on their supporting plates 82 by loosening the connecting bolts 86. During the movement of the jaws along their respective tracks, the raised edged portions 154 of the links project above the level of the platform sections as shown in Figs. 2, 7 and 11 and the jaws thereof maintain their grip on the wire stock without interference until the rear end of the platform is reached.

Shortly after leaving the sprocket and toothed wheel assemblies at the forward end of the platform, the upwardly inclined fold section of each fabric strip is positively urged against the wire stock for the stitching operation to be followed thereafter. For this purpose, there is provided the two opposite platform sections 34—34 adjacent to the toothed wheels 20—20, a plate member under which the folded fabric strips must pass. As shown in Fig. 7, a narrow horizontally extending plate 158 is supported in slightly spaced relationship above each platform section 34. The plate is provided with a vertical section 160 which is bolted to a right angular bracket member 162 extending along and supported upon the outer margin of the platform section 34. The bracket members 162—162 on opposite sides of the platform are spaced apart just sufficient to allow the wire stock and the fabric folded thereover to pass therebetween and in this manner the wire stock is held from lateral movement over the platform. The plates 158 of each platform section are raised thereabove just sufficient to allow the marginal portions of the wire stock and the fabric strips folded thereover to slide thereunder. The forward end section 164 of each plate 158 projects beyond the bracket support 162 therefor and is preferably flared upwardly as shown in Fig. 1 to facilitate movement of the fabric strips and the wire stock thereunder.

At one or more positions along each side of the platform a stitching machine is provided for securing the marginal fabric strips to the wire stock as it continuously advances along the platform. As shown in Fig. 1, two stitching machines 166 and 168 are shown mounted on the same side of the platform, it being understood that a similar pair of stitching machines are located on the opposite side of the platform and in line therewith. The stitching machines are generally of conventional design except for a novel feature hereinafter particularly described for preventing breakage of needles when striking any portion of the wire stock. Referring to Figs. 1 and 8, each oppositely disposed set of stitching machines is supported upon a transversely extending generally rectangular shaped frame which seats over and projects beyond the longitudinal side bars 30—30. The frame for each pair of oppositely disposed stitchers comprises a pair of elongated upwardly converging side members 170—170 extending transversely to the longitudinal dimension of the machine, one of which is shown in the sectional view of Fig. 8. The opposite ends of the side members of each frame are connected together by short members 172—172. Each frame rests cross-wise on the longitudinal side bars 30—30 of the machine and as shown in Fig. 8 are secured thereto by bolts 174 which extend vertically through the side bars into the bottom edges of the side members 170—170 of the frame.

Each stitching mechanism 168 comprises an inwardly curved head 176 arranged to overlie the adjacent folded fabric strip 98 on the wire stock. The head 176 is supported in upright position on a base plate 178 which rests upon and straddles the side members 170—170 of the frame. The base plate is transversely adjustably secured to the frame by a vertical bolt 180 which projects downwardly in the space between the side members and is connected at its lower end to a cross member 182 which abuts the bottom edges of both side members. Loosening the bolt 180 will permit the stitching machine to be shifted transversely along the side members 170—170 either toward or away from the platform and thereby vary the position of the line of stitching on the fabric strip over which the stitcher head is disposed.

Each stitcher head 176 is equipped with a presser foot 183 and a vertically reciprocating needle bar 184 having a needle 186 on the lower end to which a thread 188 is fed in the conventional manner. The needle bar is reciprocated by a needle bar actuating lever 190 pivoted on a laterally projecting pin 192 and connected to the bar through the link 194. A driving member 196 for the lever of generally T-shaped formation is disposed in offset parallel relation to the lever and has one end of the cross of the T separately pivotally mounted on the pin 192. The opposite end of the cross of the T is connected to the upper end of a vertical arm 198, the lower end of which is provided with a bearing which embraces a circular cam 200 eccentrically mounted on a rotating shaft 202. The lever 190 is provided with a downwardly and rearwardly curved portion 204 which is shaped at its outer end to abut the leg of the T-shaped member 196 and serves as a stop limiting downward swinging movement of the needle bar relative to the T-shaped member.

A distinctly novel feature of the present invention is the provision for yieldingly driving the needle of each stitching mechanism and which in the event the needle should strike a portion of the wire stock will allow the needle to discontinue further penetration of the fabric material while the balance of the stitching mechanism continues to operate uninterruptedly. This feature prevents breakage of the needle and eliminates the need of providing means for controlling the action of the needle to avoid the sections of the wire stock passing thereunder. This operating feature is preferably accomplished by providing a yielding driving connection between the needle bar actuating lever 190 and the T-shaped driving member 196 therefor. Referring to Figs. 8 and 10, the lever 190 is provided with an upwardly and rearwardly extending arm 206 which is flanged inwardly at its upper end to provide a horizontal portion 208 which overlies the member 196 in spaced relation thereto. A heavy coiled spring 210 is located in this space, the upper end of which is seated on the portion 208 of the arm and the lower end of which is seated on the rearwardly extending cross of the T of the member 196. In normal operation, rocking movement of the T-shaped member imparted thereto by the reciprocating arm 198 is transmitted through the spring 210 and causes the lever 190 to rock therewith and impart a downward stroke to the needle bar. In the event the needle should strike a portion of the wire stock as it penetrates the fabric material, the spring 210 will yield allowing the needle to discontinue further downward movement and permitting the moving parts of the stitching machine to uninterruptedly continue their cycle of operation until the member 196 is rocked in the direction to lift the lever and the needle to the upper ends of their strokes.

Each stitching machine 168 is provided with a flat table 212 under the head 176 thereof having an opening 214 as shown in Fig. 9 across which a slotted plate 216 extends. The latter is located under the needle bar 184 and is provided with a circular aperture 218 through which the needle reciprocates. The table 212 is on the same plane and co-extensive with the platform section 34 over which the head lies and as the wire stock passes thereby the adjacent fabric covered side margin of the stock passes over the table and over the opening through which the needle operates. Below the opening of the table, the stitching machine is provided with a conventional looper (not shown) which is operated in timed synchronism with the actuating lever 190 by a rod 220 which extends rearwardly under the table and is pivotally connected to the leg of the T-shaped member 196.

To provide clearance for the adjacent chain track and to assist in supporting the plate 40, the operating shaft 202 of each stitching machine 168 is extended so as to project under and inwardly beyond the track as shown in Figs. 8 and 9. Mounted on the inner projected end of the shaft 202 is a sleeve 222 fixed to the housing of the stitching machine. The upper side of the sleeve is provided with a flat face 224 (Fig. 9) which abuts the underside of the track plate 40 assisting in the support thereof while at the same time serving as a journal support for the shaft. The sleeve 222 terminates short of the inner projecting end of the shaft and mounted on the latter is a collar 226 carrying an eccentric mounting 228 for a rocking curved arm 230 which is connected by bracket 232 to a plate 234 for operating parts of the stitching mechanism under the table forming no part of the present invention. It is understood that other operating parts of the stitching machine illustrated in Figs. 8, 9 and 10 are shown but since these parts are conventional they are not particularly referred to herein.

The operating shaft 202 of each pair of opposed stitching machines carries a gear 236 on the outer end thereof which meshes with a gear 238 fixed to but axially adjustable on a transversely extending drive shaft 240 running the entire length of the frame between the side members 170—170 thereof and journaled in the end members 172—172 thereof. Intermediate the ends of the shaft a sheave wheel 242 is fixed about which is passed an endless belt 244. The latter as shown in Fig. 8 is passed around a sheave wheel 246 fixed on a shaft 248 located below and extending parallel to the shaft 240. Shaft 248 is supported for rotation by journal blocks 250—250 which are suspended from the shaft 240 by the arms 252—252. Shaft 248 carries a larger sheave wheel 254 around which a forwardly and slightly downwardly inclined endless belt 256 is passed. The latter as shown in Figs. 1 and 7 is passed between two juxtaposed conical shaped sheave wheels 258 and 260 mounted on a shaft 262 and forming a Reeve's transmission for varying the speed at which the belt 256 is driven. This is accomplished by axially adjusting one of the conical sheave wheels relative to the other in accordance with this type of variable speed transmission, and for which purpose a handle 264 and control shaft 266 is provided. One of the conical sheave wheels is peripherally grooved to receive one end of an endless drive belt 268 which extends rearwardly as shown in Fig. 1 to an electric motor 270 slidably adjustably mounted on the horizontal frame member 14.

The forward opposed pair of stitching machines may be driven from each of the rear set by an endless belt connection 272 extending between the two operating shafts 202 of the machines located on the same side of the platform. As shown in Figs. 1 and 8 the connecting belt is trained over corresponding sheave wheels 274 fixed on the shafts 202 adjacent to the gear 236.

The stitched fabric and wire stock is conveyed rearwardly from the stitching machine positions by the chains 26 and 28 and separated therefrom as the chain links change from a straight line motion to pass around the rear set of sprocket wheels 24. As previously described, the links as they engage the sprocket wheels are carried downwardly therearound and are pivoted with respect to one another to spread the cooperating recesses 156 and open the wire gripping jaws. However, to insure that the transverse portions 94 of the wire stock are sprung out of the chain gripping jaws, the rear ends of the outer platform sections 34—34 are each provided with means which yieldingly urges the wire portions out of the jaws. As shown in Figs. 1 and 13 there is provided on the extremity of each platform section 34 a flexible plate 276 of rectangular formation having its forward end section secured by bolts 278 or the like to the upper side of the platform section. The intermediate portion of each plate is bent or curved upward to a height above the level of the platform and the raised portions 154 of the chain links. The rear end section of each plate may be slightly curved downwardly as shown.

As the fabric covered side margins of the wire stock travel over the plates 276 they are lifted thereby imposing a tension on the wire portions 94 in the jaws of the chain links tending to spring the same upwardly out of the jaws. The jaws of the links open gradually as the links change their direction of movement to pass around the sprocket wheels 24 and the upward tension imposed on the wire portions 94 snaps them out of the jaws. The variable pressure impressed on the plates 276 as successive sections 94 of the wire stock are freed causes the free end of the plates to vibrate at a relatively rapid rate in an upward and downward direction further increasing the upward tension upon the wire sections to release them from the conveyor chains. The vibratory action of the plates has been found in practice to be better than a rigid elevation and to positively insure the release of the wire stock from the conveyor.

The freed fabric covered marginal portions of the wire stock are passed over a pair of drums 280—280 which as shown in Fig. 12 are mounted on a shaft 282 and axially spaced thereon to receive the side margins of the wire stock. The opposite ends of the shaft are journaled in the vertical sections of a pair of correspondingly shaped frame members 284—284. The frame members are each provided with a forwardly and downwardly inclined section which are supportingly mounted on the rear ends of the side frame members 30—30 of the machine. Overlying each drum 280 is a smaller drum 286 freely rotatable on a common shaft 288. The opposite ends of the shaft 288 are supported in vertical slots 290 of the frame members 284—284 and the smaller drums are resiliently urged downwardly upon the larger drums by coiled springs 292 each connected at one end onto the shaft 288 and fixed to a projecting lug 294 on each frame member therebelow. Shaft 282 and the drums 280—280 are operatively connected to the conveyor for rotation therefrom by means of an endless chain 296 passed around sprocket gears on the shaft 282 and the shaft 90 of the rear set of sprocket wheels 24. After passing over the drums 286—286, the combined wire stock and fabric strip article may be fed downwardly as shown in Fig. 1 and collected in bundles or rolls for future use.

However, in many instances it is desirable to add one or more additional fabric strips to the article formed by the machine thus far described. For this purpose a removable smaller unit is mounted in the rear of the machine in position to receive the spring liner material produced thereby and provision is made for feeding fabric material thereto and securing the same to the wire stock. Referring to Figs. 13, 14 and 15, a unit of this character is shown comprising a floor engaging support 300 generally similar to that previously described upon which an open rectangular frame 302 is mounted. Supported upon the latter and extending transversely to the longitudinal dimension of the machine is an elongated frame 304 similar to the stitching machine frames 170—170 and 172—172 previously described. Mounted on the frame 304 is the base plate 306 of a stitching machine similar to the base plate 178 previously described in connection with Fig. 8. Rising from the base plate and inwardly curved is a head 308 of a stitching machine similar to head 176 previously referred to and reciprocatingly supporting a needle bar 310 which is located on the unit approximately midway between the opposite side margins of the spring liner advanced thereunder. A table 312 forming part of the stitching machine is co-extensive with the upper surface of a rectangularly shaped frame supported member 314, the two together serving as a platform across which the previously formed spring liner is continuously advanced. The remaining parts of the stitching mechanism are the same as those described previously.

An additional fabric strip 316 of burlap or the like is fed from a roll 318 of this material which is mounted centrally above the spring liner forwardly of the stitching machine 306—308. For this purpose, as shown in Fig. 13, the roll 318 is mounted on a transverse shaft 320 carried upon the upper ends of two vertical arms 322 disposed on opposite sides of the machine and connected in any suitable manner to rear frame assembly 22 thereof over a roller 324 located above the shaft 282 and thence between the roller and a second lower roller 326 of smaller size which freely rotates on the shaft 288 immediately above the spring liner passing thereunder. The roller 324 is oscillatingly supported for bodily vertical movement relative to the roller 326 in order to accommodate any variations in the thickness of the fabric strip 316 and to smooth the feed thereof to the liner material. For this purpose the roller 324 is carried by a pair of correspondingly shaped arms 328—328 which extend rearwardly parallel to one another and are pivotally connected to a transverse shaft 330. The opposite ends of the latter are connected to a pair of vertically extending right angularly shaped bracket members 332—332 which are located in corresponding positions on opposite sides of the machine and as shown in Fig. 13 have their lower ends secured to the frame members 284—284.

The stitching machine is driven by an endless chain 334, one end of which is trained over a sprocket gear 336 fixed on the main shaft 338 of the stitcher corresponding to shaft 240 previously described and the opposite end of which is passed over a sprocket gear 340 on the shaft 90. In operation, the stitcher 308 forms a central fabric strip in the spring liner of the character shown at 102 in Fig. 17. If desired two stitching machines 308 may be located side-by-side to stitch a double row of threads in the central fabric strip such as shown at 104—104 in Fig. 17. Wider central strips may be secured to the spring liner material and in such cases the lines of stitching securing the same to the liner material may be spaced relatively widely apart.

What we claim is:

1. A spring liner forming machine comprising, in combination, an elongated platform, a movable mounted member on the platform adapted to travel the length thereof, means for feeding successive sections of laterally bent wire stock upon one end of said platform, and means for causing said member to engage successive sections of said bent wire stock as it is fed upon the platform and to carry the same therewith while it travels to the other end of the platform.

2. A spring liner forming machine comprising, in combination, an elongated platform, a movable mounted member on the platform adapted to travel the length thereof, means for feeding successive sections of reversely laterally bent wire stock upon one end of said platform, means for causing said member to engage successive sections of said bent wire as it is fed upon the platform and to carry the same therewith while it travels to the other end of the platform, means for feeding liner material into engagement with at least one side margin of said bent wire stock as it is fed upon the platform and causing the same to travel with the wire the full length of the platform, and means mounted adjacent to the path of travel of the wire and the liner material over the platform for securing the same together.

3. In a machine for forming spring liners, a platform, a toothed wheel mounted above one end of the platform and adapted to engage successive sections of a reversely laterally bent wire stock and feed the same upon the platform, and an endless linked chain having a portion of its length adjacent to said platform and movable from said end of the platform to the other end thereof, the individual links of said chain being provided with wire gripping means adapted to engage the wire stock as it is fed upon the platform by said toothed wheel and carry the wire stock therewith to the other end of the platform.

4. In a machine for forming spring liners, a platform, a sprocket wheel mounted above one end of the platform and adapted to engage reversely laterally bent wire stock and feed the same upon the platform, an endless linked chain having a portion of its length disposed adjacent to the platform and movable from said end of the platform to the other end theerof, the individual links of said chain being provided with wire gripping portions adapted to engage the wire stock as it is fed upon the platform by said sprocket wheel and carry the wire stock therewith to the other end of the platform, means for feeding a strip of liner material into folded overlapping engagement with one side margin of the wire stock and causing the same to travel with the wire stock along said platform, and a stitching device mounted alongside of the platform and adapted to stitch the overlapping portions of the strip of liner material together between the reversely bent portions of the wire stock.

5. In a machine for forming spring liners, a supporting frame carrying a substantially horizontal platform on the upper portion thereof, an endless linked chain adapted to have a portion of its length moved longitudinally along the platform from one end to the other end thereof, a toothed wheel rotatable about a horizontal axis and disposed above said first mentioned end of the platform and adapted to feed successive sections of reversely laterally bent wire stock upon the platform, each pair of the links of said endless chain cooperating with one another to grip transversely extending portions of the wire stock and cause the same to travel therewith the length of the platform, means for feeding a strip of fabric material to said first end of the platform and folding the same in overlapping engagement with one side margin of the wire stock, means for causing the folded fabric strip to travel with the wire stock over the platform, and a stitching device supported by the frame adjacent to the path of travel of the wire stock and the fabric liner on the platform and adapted to stitch the fabric liner to the wire stock as it advances along the platform.

6. In a machine for forming spring liners, a frame supporting a horizontal elongated platform, a pair of endless linked chains supported by the frame adjacent to the opposite side portions of the platform and adapted to have a portion of their respective lengths travel alongside the platform from one end to the other end thereof, a pair of toothed wheels rotatable about a common horizontal axis mounted by the frame above said first mentioned end of the platform, said toothed wheels adapted to engage successive sections of reversely laterally bent wire and carry the same thereunder onto said first mentioned end of the platform and in the same direction of travel as said portions of the chains, each link of said chains being shaped to cooperate with adjacent links to form wire gripping means and adapted as the wire is fed upon the platform to engage the wire and carry the same therewith from said end of the platform to the other end thereof.

7. In a machine of the class described, a frame, an elongated substantially horizontally extending table supported by the frame, an endless linked chain, means carried by the frame for supporting the linked chain adjacent to the table such that a portion of the chain is substantially on the level of the table and for causing said portion of the chain to move parallel to the longitudinal dimension of the table from one end to the other end thereof, means for feeding laterally bent wire stock upon said first mentioned end of the table, the individual links of said chain each provided adjacent to at least one end thereof with a wire receiving notch adapted to cooperate with a similar notch in the next adjacent link to form a jaw for gripping a portion of said wire stock thus fed upon the table and carry the wire stock therewith as they move the length of the table.

8. In a machine of the class described, a frame, an elongated substantially horizontally extending table supported by the frame, a pair of endless linked chains, means carried by the frame for supporting the chains on opposite sides of the table such that one portion of each chain extends on the level of the table and for causing the said portions of the chains to move at the same rate of speed parallel to the table from one end to the other end thereof, means for feeding reversely laterally bent wire stock upon said first mentioned end of the table, each individual link of said chain provided adjacent to its opposite ends with a wire receiving notch adapted to cooperate with similar notches in the next adjacent links thereto to form jaws for releasably gripping laterally extending portions of said wire stock thus fed upon the table, the jaws formed by the notches of the links being self-operable to either open or closed position by the change of direction of the motion of the chains either into or out of a straight line.

9. In a machine of the class described, a frame, an elongated substantially horizontally extending table supported by the frame, an endless linked chain, means carried by the frame for supporting and moving a portion of the chain parallel to the longitudinal dimension of the table on substantially the plane of the upper surface thereof including a sprocket wheel adjacent to one end of the table, means for feeding reversely laterally bent wire stock upon the table adjacent to said sprocket wheel, the individual links of said chain being provided with at least one wire receiving notch adapted to cooperate with a similar notch in the next adjacent link thereto to form a jaw for gripping a laterally extending portion of the wire stock fed upon the table, said links as they pass around said sprocket wheel being pivoted in one direction with respect to one another to open the jaws to receive laterally extending portions of the wire stock as they are fed upon the table and being pivoted in the opposite direction after they leave the sprocket wheel for straight line motion to close the jaws into gripping engagement with the portions of the wire stock received therewithin.

10. In a machine of the class described, a frame, an elongated substantially horizontally extending table supported by the frame, an endless chain formed of pivotally connected links, a pair of sprocket wheels for the endless chain supported by the frame adjacent to the opposite ends of the table and rotatable about the horizontal axes, said sprocket wheels being so located with respect to the table that when rotated they cause a portion of the chain length to enter upon the level of the table at one end thereof for straight line motion to the opposite end of the table, means for feeding successive sections of a reversely laterally bent wire stock upon the table in the direction of the motion of said portion of the linked chain, the individual links of said chain each provided with at least one wire receiving notch adapted to cooperate with a similar notch on the next adjacent link thereto to form a jaw for gripping a portion of the wire stock, said links as they pass around the sprocket wheel prior to entering upon the table level for straight line motion adapted to pivot with respect to one another to open the jaws for receiving portions of the wire stock and further adapted when leaving the sprocket wheel for straight line motion to pivot in the opposite direction with respect to one another to close the jaws into gripping engagement with the portions of the wire stock received therewithin.

11. In a machine of the class described, a frame, an elongated substantially horizontally extending table supported by the frame, a pair of endless chains each formed of a series of pivotally connected links, a pair of sprocket wheels for each endless chain supported by the frame adjacent to the opposite ends of the table and rotatable about horizontal axes, the sprocket wheels for one chain being located on one side of the table and the sprocket wheels for the other chain being located on the other side of the table and so related to the table that when rotated a portion of their respective chain lengths enters upon the level of the table at one end thereof and travels the length thereof, means for feeding successive sections of reversely laterally bent wire stock upon said entering end of said table, the individual links of each endless chain being each provided with a recess adjacent to the opposite ends thereof adapted to cooperate with similar recesses in the next adjacent links to form jaws for gripping the laterally extending portions of the wire stock, said links as they pass around the sprocket wheels adjacent to said entering end of the table adapted to pivot with respect to one another to open the jaws for receiving laterally extending portions of the wire stock fed upon the table and adapted when leaving the sprocket wheels for straight line motion to pivot with respect to one another to close the jaws for gripping engagement with the portions of the wire stock received therewithin, said links further adapted as they pass around the sprocket wheels at the opposite end of the table to pivot with respect to one another to open the jaws and release the portions of the wire stock received therewithin.

12. In a machine of the class described, an elongated substantially horizontal table provided with a longitudinally extending upwardly opening slot running the length of the table, an endless chain having a portion of its length located in said slot, means for causing said chain to travel in the slot from one end of the table to the other end thereof, means for feeding reversely bent wire stock having transversely extending portions upon the table in the direction of the travel of said chain and in such a manner as to cause the transversely extending portions thereof to overlie the slot, and means carried by the chain projecting above the level of the table and engaging the transversely extending portions of the wire stock overlying the slot for causing the wire stock to move therewith the length of the table.

13. In a machine of the class described, an elongated substantially horizontal table provided with a recessed track running the length thereof, wire advancing means movable in one direction along the track and projecting above the level of the table, means for feeding reversely laterally bent wire stock upon the table in the same direction of movement as said wire advancing means and with transversely extending portions of the wire stock overlying the track, the projecting portions of said wire advancing means provided with releasable jaws adapted to grip the transversely extending portions of the wire stock overlying the track and cause the wire stock to travel therewith as said advancing means moves the length of the table.

14. In a machine for forming spring liners, an elongated table provided with a recessed track running the length thereof, means for feeding reversely bent wire stock having transversely extending portions upon one end of the table so that the transversely extending portions thereof overlie the track, means for feeding a strip of liner material to said end of the table and into engagement with portions of the wire stock offset to that overlying the track, means movable in said track from said end of the table to the other end thereof and projecting above the level of the table for engagement with the transversely extending portions of the wire stock overlying the track, said last means adapted to advance wire stock therewith and cause the same to travel the length of the table, and means adjacent to the path of travel of said wire stock for stitching the liner material to the wire stock.

15. In a machine for forming spring liners, an elongated table provided with a recessed track running the length thereof, means for feeding reversely bent wire stock having laterally extending portions upon one end of the table in such a manner that the laterally extending portions thereof overlie the track and project on opposite sides thereof, means for feeding a strip of liner material to said end of the table and causing the same to engage a portion of the wire stock to one side of said track, an endless chain formed of a series of pivotally connected links having a part of its length located in said recessed track and extending the length thereof, means for causing said chain to travel along said track from said first mentioned end of the table to the other end thereof, the individual links of said chain having portions thereof projecting above the level of the table and shaped to provide jaws adapted to grip the laterally extending portions of the wire stock overlying the track and to cause the same to move therewith the length of the table, and stitching means overlying the table and provided with a vertical reciprocating needle adapted to pierce the liner material as it passes thereunder and secure the same to the wire stock.

16. In a machine for forming spring liners, an elongated table provided with an upwardly opening recessed track running substantially the length thereof, means for feeding reversely bent wire stock upon one end of the table in such a manner that transverse sections of the stock overlie the track and project beyond the opposite sides thereof, means for feeding a strip of liner material to said end of the table and for causing the same to lie against a projecting portion of the wire stock on one side of the track, an endless chain formed of a series of pivotally connected links having a part of its length located in said recessed track, means for advancing the part of said endless chain in the recessed track from said end of the table toward the opposite end thereof, the individual links of the endless chain each having a portion projecting above the level of the table and provided with a recess adapted to cooperate with a similar recess on the projecting portion of the next successive link to form jaws for gripping the transversely extending sections of the wire stock overlying the track and causing the same to move therewith, means for tensioning the strip of liner material to move in the same direction as said chain and wire stock, and stitching means supported by the table on one side of the track and provided with a vertical reciprocating needle adapted to pierce the liner material and stitch the same to the wire stock.

17. In a machine for forming spring liners, an elongated substantially horizontal table having a material entering end and a material discharge end and provided with a pair of parallel spaced apart upwardly opening recessed tracks running substantially the length of the table, means for feeding reversely bent zigzag shaped wire stock upon the entering end of the table such that transverse sections of the stock overlie the pair of recessed tracks, a pair of sprocket wheels associated with each track and disposed adjacent to the opposite ends thereof, an endless chain for each track and associated set of sprocket wheels, said chains each being formed of a pivotally connected series of links and being trained about their respective sets of sprocket wheels such that a part of their lengths are disposed in their respective recessed tracks, means for rotating said sprocket wheels in the direction to move said parts of the chains along the tracks from said material entering end of the table to the other end thereof, each individual link having a portion thereof projecting above the level of the table and shaped with a recess adapted to cooperate with a similar recess on the projecting portion of the next successive link to form a pair of jaws, said links as they change from a curved to a straight line motion at the entering end of the table pivoting with respect to one another to close the jaws thereof upon the transverse sections of the wire stock for joint movement of the chains and wire stock along the table, and said links as they change from a straight line motion to a curved motion at the discharge end of the table pivoting with respect to one another to open the jaws and release the wire stock therefrom.

18. In a machine for forming spring liners, an elongated substantially horizontal table having a material entering end and a material discharge end and provided with pair of parallel spaced apart upwardly opening recessed tracks running substantially the length of the table, means for feeding reversely bent zigzag shaped wire stock upon the entering end of the table such that transverse sections of the stock overlie the pair of recessed tracks, a pair of sprocket wheels associated with each track and disposed adjacent to the opposite ends thereof, an endless chain for each track and associated set of sprocket wheels, said chains each being formed of a pivotally connected series of links and being trained about their respective sets of sprocket wheels such that a part of their lengths are disposed in their respective recessed tracks, means for rotating said sprocket wheels in the direction to move said parts of the chains along the tracks from said material entering end of the table to the other end thereof, each individual link having a portion thereof projecting above the level of the table and shaped with a recess adapted to cooperate with a similar recess on the projecting portion of the next successive link to form a pair of jaws, said links as they change from a curved to a straight line motion at the entering end of the table pivoting with respect to one another to close the jaws thereof upon the transverse sections of the wire stock for joint movement of the chains and wire stock along the table, and said links as they change from a straight line motion to a curved motion at the discharge end of the table pivoting with respect to one another to open the jaws and release the wire stock therefrom, and means at the discharge end of the table acting to elevate the wire stock above the level of the table to assist in the release of the wire stock from the jaws of the chain links.

19. In a machine of the class described, an elongated substantially horizontally extending table having a material entering end and a material discharge end and provided with an upwardly opening groove running substantially the full length thereof and forming a recessed track, a sprocket wheel disposed below and adjacent to each end of the track, an endless chain composed of a pivotally connected series of links trained over said sprocket wheels and arranged such that a part of the chain length is disposed in said recessed track, means for rotating said sprocket wheels to advance said part of the chain length from said material entering end of the table to the other end thereof, each individual link of the chain having a portion thereof projecting above the level of the table and shaped to cooperate with a similar projecting portion of the next adjacent link thereto to form a self-operable jaw for gripping the material and conveying the same the length of the track, said links being responsive to the change from a curved to a straight line motion at the entering end of the table to close the jaws upon the material for joint movement of the chain and material to the opposite end of the table and being responsive to the change from a straight line motion to a curved motion at the discharge end of the table to open the jaws and release the material therefrom.

20. In a machine of the class described, a elongated substantially horizontally extending table having a material entering end and a material discharge end, a sprocket wheel at each end of the table, an endless chain composed of a series of pivotally connected links trained over said sprocket wheels and arranged such that a part of its length extends longitudinally of the table and substantially flush with the upper surface thereof, means for rotating said sprocket wheels to advance said part of the chain length from said material entering end of the table to the material discharge end thereof, jaw elements carried by individual links of the chain cooperating with jaw elements on adjacent links for releasably gripping material and responsive to the change of the links from a curved motion to a straight line motion at the entering end of the table to close the jaw elements on material for conveying the same to the opposite end of the table and responsive to the change of the links from a straight line motion to a curved motion at the material discharge end of the table to open the jaw elements for releasing the material.

21. In a machine of the class described, a conveyor chain composed of a series of pivotally connected links, means for advancing said chain in a curved path of travel and thereafter advancing the chain in a straight path of travel, a jaw element on each successive individual link of the chain shaped to cooperate with a jaw element on the immediate adjacent link of the chain for releasably gripping a wire, said jaw elements being responsive to the change in direction of travel of the chain from said curved path to said straight path to move from an open wire receiving position to a closed wire gripping position to carry the wire with the chain along its straight path of movement.

22. In a machine of the class described, an elongated platform, means for feeding laterally bent wire stock upon one end of the platform, an endless flexible member having a section of its length adapted to travel along the platform from said end to the other end thereof, and gripping means carried by said member engageable with portions of said bent wire stock to cause the same to travel the length of the platform.

23. In a machine of the class described, a platform, means for feeding a reversely bent wire to one end of the platform, means for feeding fabric material to said end of the platform and for causing said fabric material to overlie the bent wire on the platform, means adjacent to the path of travel of said wire and said fabric material for stitching the latter to the wire, an endless flexible drive member arranged to have a section of its length travel along the platform from said end of the platform to the other end of the platform, and gripping means carried by said endless drive member engageable with portions of the bent wire to cause the same and the fabric material to travel the length of the platform.

ANTHONY SHANER.
JOHN C. HAMPSON.

REFERENCES CITED

The following references are of record in the file of this patent:

UNITED STATES PATENTS

| Number | Name | Date |
|---|---|---|
| 413,757 | Lewy | Oct. 29, 1889 |
| 1,894,409 | Mathewson | Jan. 17, 1933 |
| 2,200,605 | Pierce | May 14, 1940 |
| 2,358,689 | Dasher | Sept. 19, 1944 |

FOREIGN PATENTS

| Number | Country | Date |
|---|---|---|
| 431,920 | Great Britain | July 17, 1935 |